(12) United States Patent
Kim (10) Patent No.: US 9,298,349 B2
(45) Date of Patent: *Mar. 29, 2016

(54) METHOD FOR RELEASING A LOCKING IN MOBILE TERMINAL AND MOBILE TERMINAL USING THE SAME

(71) Applicant: LG ELECTRONICS INC., Seoul (KR)

(72) Inventor: Eun Young Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,470

(22) Filed: Mar. 14, 2014

(65) Prior Publication Data

US 2014/0195937 A1 Jul. 10, 2014

Related U.S. Application Data

(63) Continuation of application No. 12/492,086, filed on Jun. 25, 2009, now Pat. No. 8,712,392.

(30) Foreign Application Priority Data

Mar. 2, 2009 (KR) ........................ 10-2009-0017473

(51) Int. Cl.
*G06F 3/0481* (2013.01)
*G06F 3/0488* (2013.01)
*G06F 3/0484* (2013.01)
*H04M 1/67* (2006.01)

(52) U.S. Cl.
CPC .......... *G06F 3/04817* (2013.01); *G06F 3/0488* (2013.01); *G06F 3/04847* (2013.01); *G06F 3/04883* (2013.01); *H04M 1/67* (2013.01); *H04M 2250/22* (2013.01)

(58) Field of Classification Search
CPC . H04M 1/663; H04M 1/575; H04M 2250/22; G06F 3/04883; G06F 21/36; G06F 3/0484; G06F 3/017
USPC .............. 455/418; 345/173; 713/323; 726/17
See application file for complete search history.

(56) References Cited

U.S. PATENT DOCUMENTS

| 8,130,075 | B1 * | 3/2012 | Hingole | 340/5.55 |
| 2006/0117197 | A1 | 6/2006 | Nurmi | |
| 2007/0150842 | A1 * | 6/2007 | Chaudhri et al. | 715/863 |
| 2008/0052945 | A1 * | 3/2008 | Matas et al. | 34/173 |
| 2008/0278455 | A1 | 11/2008 | Atkins et al. | |
| 2009/0160778 | A1 * | 6/2009 | Nurmi et al. | 345/173 |
| 2009/0187676 | A1 * | 7/2009 | Griffin et al. | 710/14 |
| 2009/0244019 | A1 * | 10/2009 | Choi | 345/173 |
| 2009/0292989 | A1 * | 11/2009 | Matthews et al. | 715/702 |

OTHER PUBLICATIONS

Korean Intellectual Property Office Application Serial No. 10-2009-0017473, Office Action dated Apr. 13, 2015, 4 pages.

* cited by examiner

*Primary Examiner* — Nizar Sivji
(74) *Attorney, Agent, or Firm* — Lee, Hong, Degerman, Kang & Waimey (57) ABSTRACT

The present disclosure is related to a method for releasing a locking on a mobile terminal, the method comprising: locking the mobile terminal; generating a locking-release preliminary signal on the locking; creating a locking-release icon based on a generated position of the locking-release preliminary signal; and releasing the locking by selecting the locking-release icon, and to a mobile terminal using the same.

19 Claims, 5 Drawing Sheets

METHOD FOR RELEASING A LOCKING IN MOBILE TERMINAL AND MOBILE TERMINAL USING THE SAME

CROSS-REFERENCE TO RELATED APPLICATIONS

This application is a continuation of U.S. patent application Ser. No. 12/492,086, filed on Jun. 25, 2009, now U.S. Pat. No. 8,712,392, which claims the benefit of earlier filing date and right of priority to Korean Patent Application No. 10-2009-0017473, filed on Mar. 2, 2009, the contents of which are all hereby incorporated by reference herein in their entirety.

BACKGROUND OF THE DISCLOSURE

1. Field of the Disclosure

The present disclosure relates to a method for releasing a locking in a mobile terminal and a mobile terminal using the same.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase the terminal functions, the improvement of structural part and/or software part of the terminal may be considered. The recent mobile terminal has been improved to have various functions as a multimedia player as well as a basic function such as call.

For example, the mobile terminal may download to play multimedia contents files including a VOD from the broadcasting station or the internet web-site through the wireless communication network for telephone call.

Furthermore, the mobile terminal may include a short-range wireless communication means such as Bluetooth. The mobile terminal may transmit and receive files through the short-range wireless communication channel between terminals having the short-range wireless communication means.

Alternatively, the mobile terminal has a locking function to protect a user's privacy.

SUMMARY OF THE DISCLOSURE

Accordingly, an object of the present disclosure is to provide a method for releasing a locking on a mobile terminal, the method comprising: locking the mobile terminal; generating a locking-release preliminary signal on the locking; creating a locking-release icon based on a generated position of the locking-release preliminary signal; and releasing the locking by selecting the locking-release icon.

According to the one aspect of the present disclosure, the step of generating the locking-release preliminary signal may comprises determining, by a proximity sensor, whether a pointing device has approached within a predetermined distance and generating a proximity signal if the pointing device approaches within the predetermined distance.

According to another aspect of the present disclosure, the step of generating the locking-release preliminary signal comprises being touched on a first area of a touch sensor, and the step of creating the locking-release icon based on the generated position of the locking-release preliminary signal comprises creating the locking-release icon on a second area near the first area.

According to still another aspect of the present disclosure, the step of generating the locking-release preliminary signal comprises, being touched on a first area of a touch sensor, determining whether the size of the first area corresponds to that of a thumb of a human, and creating the locking-release preliminary signal when the size of the first area corresponds to the thumb of the human.

According to still further aspect of the present disclosure, the locking-release icon is a direction icon, and the step of releasing the locking by selecting the locking-release icon comprises detecting a dragging operation corresponding to a direction indicated by the direction icon.

According to still further aspect of the present disclosure, the step of generating a locking-release preliminary signal on the locking comprises limiting a preliminary signal area by user setting where the locking-release preliminary signal cab be generated, and generating a locking-release preliminary signal on the locking by selecting the preliminary signal area.

Moreover, another object of the present disclosure is to provide a mobile terminal comprising: a locking set-up unit configured to lock the mobile terminal; a sensing unit configured to generate a locking-release preliminary signal; a display unit configured to display a locking-release icon; and a controller configured to create the locking-release icon on the display unit based on a generated position of the locking-release preliminary signal, and to release the locking by selecting the locking-release icon.

According to the one aspect of the present disclosure, the sensing unit comprises a proximity sensor generating the locking-release preliminary signal by detecting a pointing device if the pointing device approaches within a predetermined distance.

According to the one aspect of the present disclosure, the sensing unit comprises a touch sensor having a first area where a pointing device is touched, and the controller creates to display the locking-release icon in a second area near the first area if the locking-release preliminary signal is generated by the touch of the first area.

According to the one aspect of the present disclosure, the sensing unit comprises a touch sensor having a first area where a pointing device is touched, and the controller creates to display the locking-release icon in a second area near the first area if the size of the first area corresponds to that of a thumb of a human.

According to the one aspect of the present disclosure, the locking-release icon is a direction icon, and the controller controls to release the locking if a drag signal to the direction icon is generated.

According to the one aspect of the present disclosure, the controller controls to limit a preliminary area by user setting, where the locking-release preliminary signal can be generated.

Another object of the present disclosure is to provide a mobile terminal comprising: a locking set-up unit configured to lock the mobile terminal; a sensing unit configured to generate a locking-release preliminary signal where a pointing device approaches a predetermined distance; a display unit configured to display a locking-release icon; and a controller configured to create the locking-release icon on the display unit based on a generated position of the locking-release preliminary signal, and to release the locking by selecting the locking-release icon.

According to the one aspect of the present disclosure, the sensing unit comprises a touch sensor having a first area where a pointing device is touched, and the controller creates to display the locking-release icon in a second area near the first area if the locking-release preliminary signal is generated by the touch of the first area.

According to the one aspect of the present disclosure, the sensing unit comprises a touch sensor having a first area where a pointing device is touched, and the controller creates to display the locking-release icon in a second area near the first area if the size of the first area corresponds to that of a thumb of a human.

According to the one aspect of the present disclosure, the locking-release icon is a direction icon, and the controller controls to release the locking if a drag signal to the direction icon is generated.

According to the one aspect of the present disclosure, the controller controls to limit a preliminary area by user setting, where the locking-release preliminary signal can be generated.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistant), a PMP (portable multimedia player), a navigation system and the like.

Except for a case applicable to a mobile terminal only, it is apparent to those skilled in the art that the configurations according to an embodiment described in this disclosure is applicable to such a stationary terminal as a digital TV, a desktop computer and the like.

Figure 1:
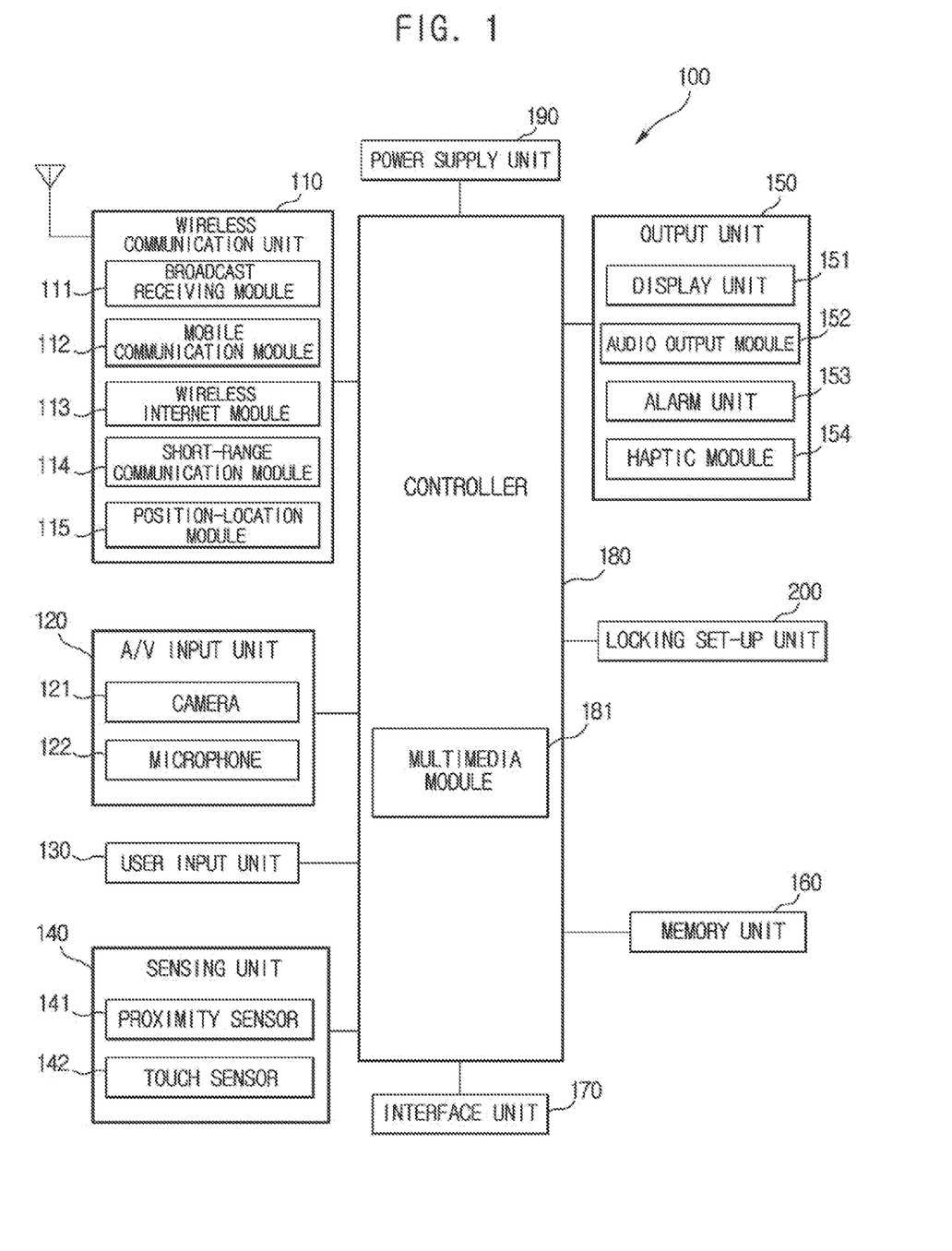
FIG. 1 is a block diagram of a mobile terminal according to one embodiment of the present disclosure.

FIG. 1 is a block diagram of a mobile terminal according to one embodiment of the present disclosure.

Referring to FIG. 1, a mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190, a locking set-up unit 200 and the like. FIG. 1 shows the mobile terminal 100 having various components, but it is understood that implementation of all of the illustrated components is not a requirement. Greater or fewer components may alternatively be implemented.

In the following description, the above elements of the mobile terminal 100 are explained in sequence.

First of all, the wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitably for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal inputs to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a position change of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a touch sensor 142.

The output unit 150 generates outputs relevant to senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operated in a phone call mode, the display will generally provide a user interface (UI) or a graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The mobile terminal 100 may include one or more of such displays.

Some of the above displays can be implemented in a transparent or optical transmittive type, which can be named a transparent display. As a representative example for the transparent display, there is a TOLED (transparent OLED) or the like. A rear configuration of the display 151 can be implemented in the optical transmittive type as well. In this configuration, a user is able to see an object in rear of a terminal body via an area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In a case that the display 151 and a sensor for detecting a touch action (hereinafter called 'touch sensor') configures a mutual layer structure (hereinafter called 'touch screen'), it is able to use the display 151 as an input device as well as an output device. In this case, the touch sensor 142 can be configured as a touch film, a touch sheet, a touchpad or the like.

The touch sensor 142 can be configured to convert a pressure applied to a specific portion of the display 151 or a variation of a capacitance generated from a specific portion of the display 151 to an electric input signal. Moreover, the touch sensor 142 may be configured to detect a pressure of a touch as well as a touched position or size. Alternatively, a separate pressure senses may be applied to detect pressure of the touch.

If a touch input is given to the touch sensor 142, signal(s) corresponding to the touch is transferred to a touch controller. The touch controller processes the signal(s) and then transfers the processed signal(s) to the controller 180. Therefore, the controller 180 is able to determine whether a prescribed portion of the display 151 is touched.

Referring to FIG. 1, a proximity sensor 141 can be provided to an internal area of the mobile terminal 100 enclosed by the touch screen or around the touch screen. The proximity sensor 141 is a sensor that detects a presence or non-presence of an object approaching a prescribed detecting surface or an object existing around the proximity sensor 141 using an electromagnetic field strength or infrared ray without mechanical contact. Hence, the proximity sensor 141 has longer durability than that of a contact type sensor and also has wider utility than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In a case that the touch screen includes the electrostatic capacity proximity sensor, it is configured to detect the proximity of a pointer using a variation of electric field according to the proximity of the pointer. In this case, the touch screen (touch sensor) can be classified as the proximity sensor 141.

In the following description, for clarity, an action that a pointer approaches without contacting with the touch screen to be recognized as located on the touch screen is named 'proximity touch'. And, an action that a pointer actually touches the touch screen is named 'contact touch'. The meaning of the position on the touch screen proximity-touched by the pointer defines a position of the pointer which vertically opposes the touch screen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touch screen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs an audio signal relating to a particular function (e.g., call received, message received, etc.). The audio output module 152 is often implemented using one or more speakers, buzzers, other audio producing devices, and combinations thereof.

The alarm unit 153 outputs a signal for announcing an occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibrations. For instance, the haptic module 154 generates an effect attributed to the arrangement of pins vertically moving against a contact skin surface, an effect attributed to the injection/suction power of air through an injection/suction hole, an effect attributed to a skim over a skin surface, an effect attributed to a contact with an electrode, an effect attributed to a electrostatic force, an effect attributed to representation of warm/cold sense using an endothermic or exothermic device and the like.

The haptic module 154 can be implemented to enable a user to sense a tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory 160 is generally used to store programs for operating the controller. Moreover, the memory 160 may temporarily store input/output data such as phonebook data, massage data, still image, and moving image. In addition, data for various patterns of vibration and/or sound outputted in case of a touch input to the touch screen can be stored in the memory 160.

The memory 160 may be implemented using any type or combination of suitable volatile and non-volatile memories or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various kinds of information for authenticating a use authority of the mobile terminal 100 and can include User Identify Module (UIM), Subscriber Identify Module (SIM), Universal Subscriber Identity Module (USIM) and/or the like. A device having an identity module (hereinafter called 'identity device') can be manufactured as a smart card. Therefore, the identity device is connectable to the mobile terminal 100 via a relevant port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize if it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. In addition, the controller 180 has a time counting function.

Moreover, the controller 180 is able to perform a pattern recognizing process for recognizing a writing input or a picture drawing input carried out on the touch screen as characters or images, respectively.

The power supply unit 190 provides a power required by various components of the mobile terminal 100. The power may be internal power, external power, or a combination thereof.

A locking set-up unit 200 is an element for protecting the user's privacy. The user may set the locking function on the mobile terminal by means of the locking set-up unit. In addition, the locking function may be so set up as to prevent the mobile terminal from operating by touching the touch sensor 142 without user's intention. It is essential to use a mobile terminal equipped an unlocking function to release the locking.

Various embodiments described herein may be implemented in a computer-readable medium using, for example, computer software, hardware, or some combinations thereof. For hardware implementation, the embodiments described herein may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may be also implemented by the controller 180.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
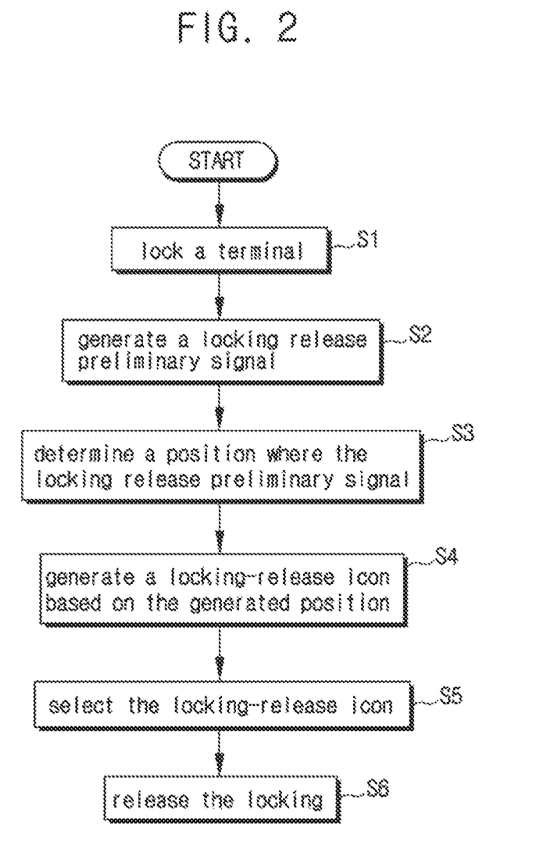
FIG. 2 is a flow chart for explaining a method for releasing a locking in the mobile terminal according to one embodiment of the present disclosure.

In the following description, the method for releasing a locking in the mobile terminal will be explained by referring to FIG. 2 to FIG. 4. FIG. 2 is a flow chart for explaining a method for releasing a locking in the mobile terminal according to one embodiment of the present disclosure, FIG. 3 is a flow chart for explaining a method using a proximity sensor in the method for releasing a locking in the mobile terminal according to one embodiment of the present disclosure, and FIG. 4 is a flow chart for explaining a method using a touch sensor in the method for releasing a locking in the mobile terminal according to one embodiment of the present disclosure.

As shown in FIG. 2, a user may set a locking on the mobile terminal by using a user input unit 130 and a locking set-up unit 200 (S1). Alternatively, a controller 180 automatically may set a locking on the mobile terminal after lapse of a predetermined time in order to prevent the mobile terminal from operating by touching a touch sensor 142 without user's intention. In a state that the mobile terminal is locked, the user may generate a locking-release preliminary signal through a sensing unit 140 (S2). the generation of the locking-release preliminary from the sensing unit 140 will be explained with referring to FIG. 3 and FIG. 4. On the other hand, the locking-release preliminary signal defines a signal which may change to a state of the mobile terminal where a locking-release signal can be received. Namely, a locking state is a state where the mobile terminal may not receive any signal except for the locking-release preliminary signal, and a locking-release ready state is a state where a menu screen of the mobile terminal 100 is displayed on the display unit 151 by receiving the locking-release preliminary signal. Again, when the locking-release preliminary signal is generated, a position where the locking-release preliminary signal is generated is determined (S3). A locking-release icon is displayed on the display unit 151 based on the generated position (S4). In case that the user selects the locking-release icon, the locking of the mobile terminal 100 is released (S5, S6). In the following description, the process for generating the locking-release preliminary signal through the sensing unit will be explained with referring to FIG. 3 and FIG. 4.

Figure 3:
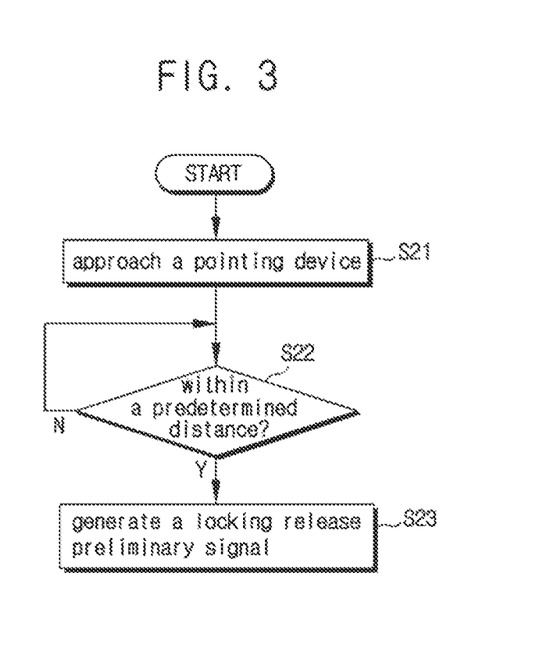
FIG. 3 is a flow chart for explaining a method using a proximity sensor in the method for releasing a locking in the mobile terminal according to one embodiment of the present disclosure.

FIG. 3 is a flow chart for explaining a method using a proximity sensor in the method for releasing the locking in the mobile terminal according to one embodiment of the present disclosure. As shown in FIG. 3, the sensing unit 140 of the mobile terminal 100 detects whether the pointing device such as a stylus pen and a finger is approached (S21). At this time, the proximity sensor may be used as a sensing unit. Besides the proximity sensor, any sensor capable of sensing a distance may be used. For example, an optical sensor may be used. If the pointing device approaches within a predetermined distance, the sensing unit 140 generates the locking-release preliminary signal. Accordingly, the locking-release icon is created on the display unit 151 (S22, S23). As shown in FIG. 2, the locking-release icon is placed near the generated position of the locking-release preliminary signal.

Figure 4:
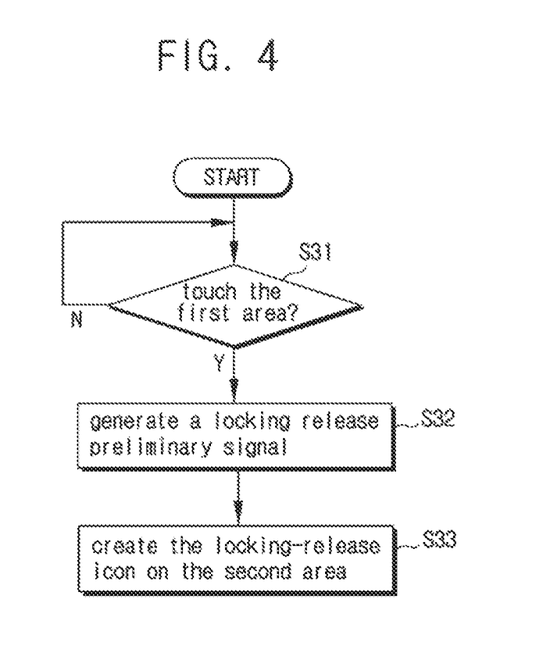
FIG. 4 is a flow chart for explaining a method using a touch sensor in the method for releasing a locking in the mobile terminal according to one embodiment of the present disclosure

FIG. 4 is a flow chart for explaining a method using a touch sensor in the method for releasing the locking in the mobile terminal according to one embodiment of the present disclosure. As shown in FIG. 4, the sensing unit 140 of the mobile terminal 100 detects whether the pointing device such as a stylus pen and a finger is touched on a first area of the display unit (S31). Namely, the touch sensor 141 is used as a sensing unit 140. If the pointing device is touched on the first area, the locking-release preliminary signal is generated. Accordingly, the locking-release icon is created on a second area (S32, S33). The second area is placed near the first area. In this state, if the locking-release icon is selected, the locking of the mobile terminal is released.

On the other hand, in a case that the pointing device is a finger, the controller 180 may check whether the pointing device is a finger to generate the locking-release preliminary signal. Namely, when the first area is touched on the touch sensor 142, the controller 180 determines whether the first area has a corresponding size with as that of a user's finger. When the size of the first area has a same or similar size of the finger, the locking-release preliminary signal is generated.

Furthermore, the preliminary signal area may be limited in order to prevent the sensing unit 140 of the mobile terminal 100 from generating the locking-release preliminary signal without user's intention. In this case, the touch signal in the limited area is confirmed as a locking-release preliminary signal. In the following description, specific embodiment of aforementioned method for releasing the locking will be described using the FIG. 5 and FIG. 6.

Figure 5:
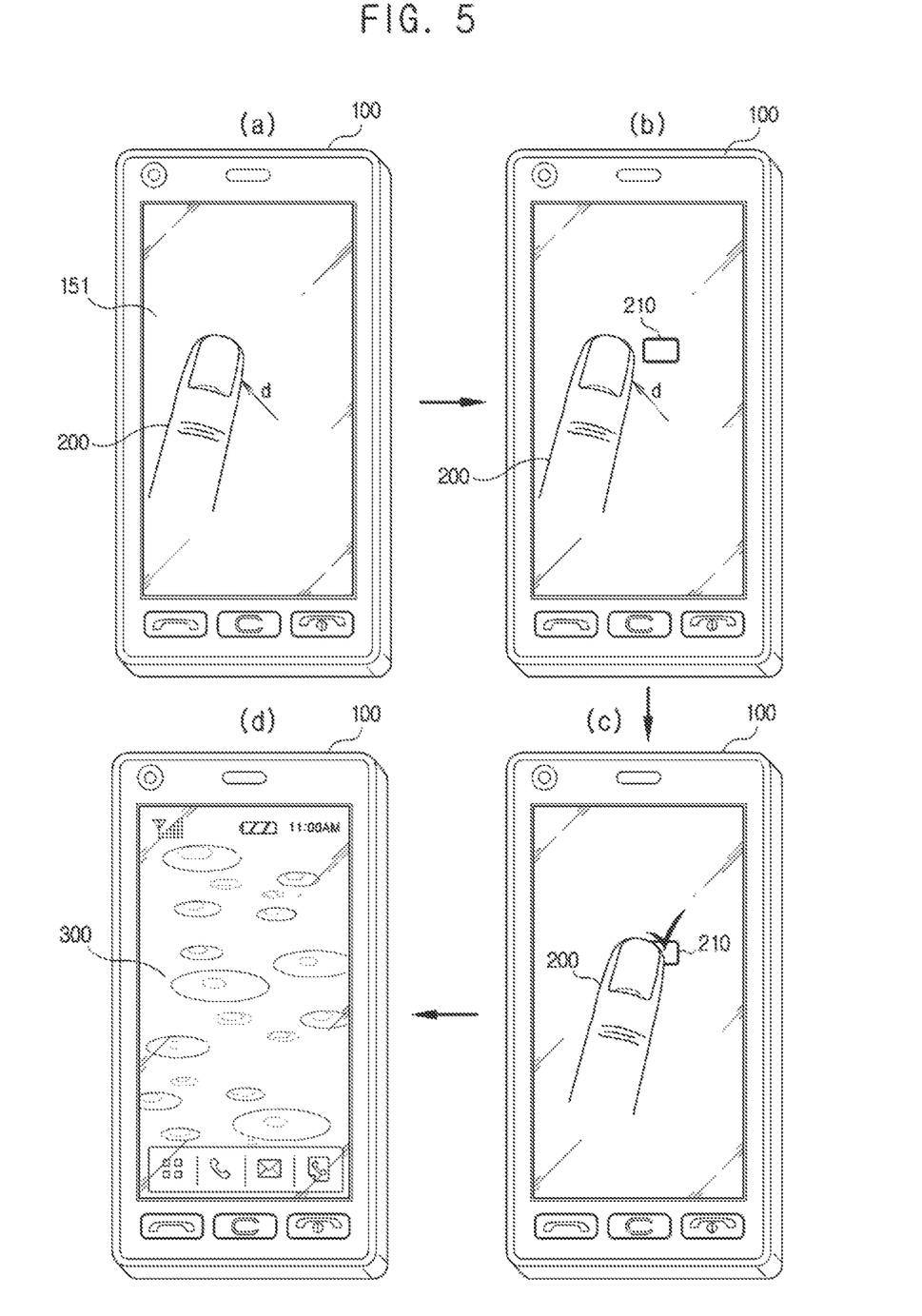
FIG. 5 illustrates image diagrams of the mobile terminal where the method of using the proximity sensor in the method for releasing a locking in the mobile terminal is applied.
Figure 6:
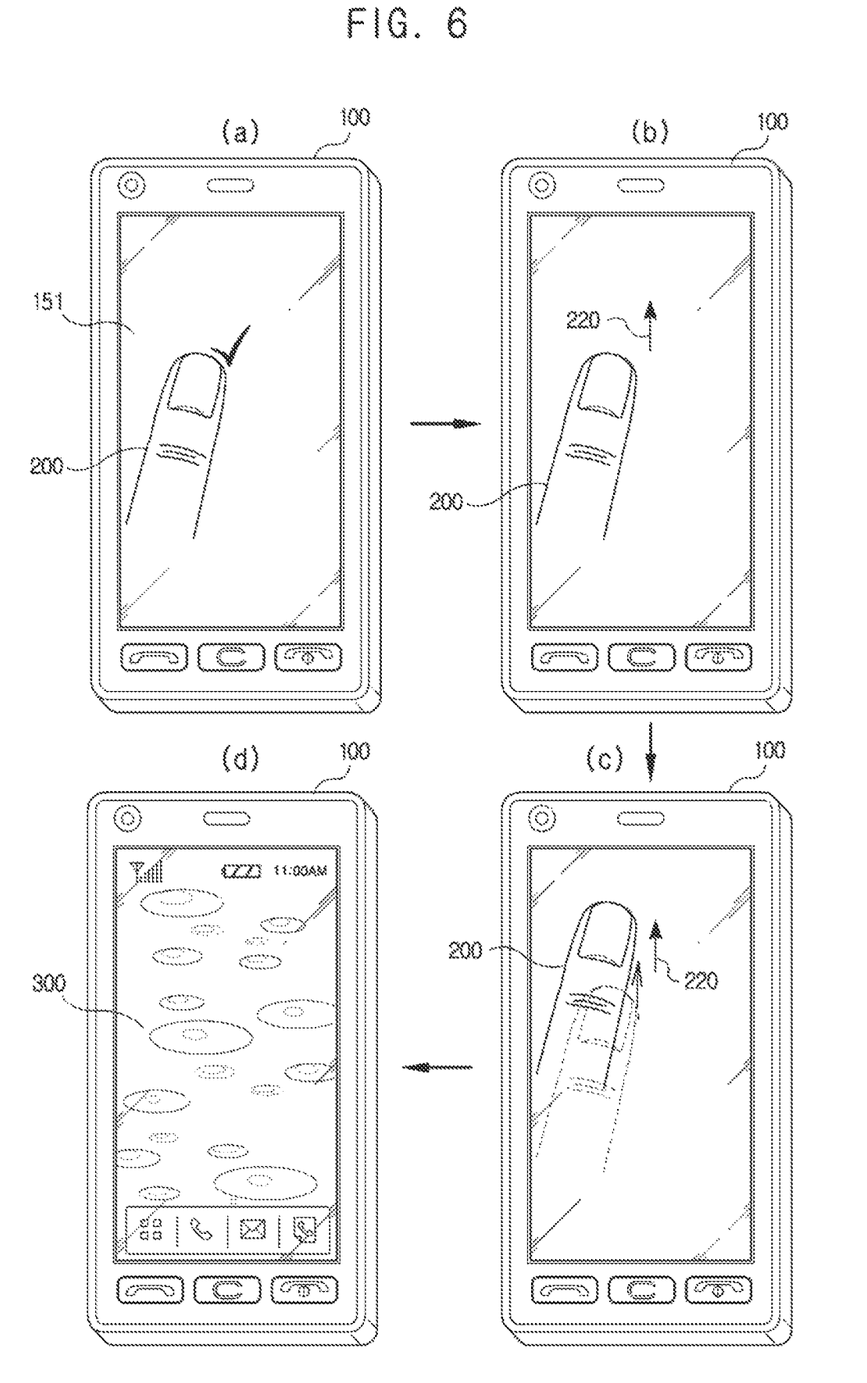
FIG. 6 illustrates image diagrams of the mobile terminal where the method of using the touch sensor in the method for releasing a locking in the mobile terminal is applied.

FIG. 5. illustrates image diagrams of the mobile terminal where the method of using the proximity sensor in the method for releasing the locking in the mobile terminal is applied and FIG. 6 illustrates image diagrams of the mobile terminal where the method of using the touch sensor in the method for releasing the locking in the mobile terminal is applied.

As shown in FIG. 5, the proximity sensor detects whether the pointing device 200 such as a finger approaches within a predetermined distance d from the mobile terminal 100 (referring to FIG. 5A). If a distance between the pointing device 200 and the mobile terminal 100 is shorter than the predetermined distance d, the locking-release icon 210 is generated near the pointing device 200 such as a finger (referring to FIG. 5B). In this state, if the user selects the locking-release icon (referring to FIG. 5C), the locking is released and the wall paper screen 300 is displayed on the display unit 151 (referring to FIG. 5D). According to this embodiment, the user can release the locking of mobile terminal with one gesture.

FIGS. 6A-6D are image diagrams of the mobile terminal where the method of using the touch sensor in the method for releasing the locking in the mobile terminal is applied.

Referring to FIGS. 6A-6D, the touch sensor (142) detects whether a pointing device 200 (e.g., a finger) has touched a display unit 151 of the mobile terminal 100 (referring to FIG. 6A), whereby an icon 220 of a predetermined direction, for example, is generated near a position touched by the pointing device 200 (referring to FIG. 6B). Under this circumstance, in a case where a user performs a dragging operation to a direction indicated by the icon 220 of the predetermined direction (referring to FIG. 6C), the locking is released and a wall paper screen 300 is displayed on the display unit 151 of the mobile terminal (referring to FIG. 6D). According to the aforementioned exemplary embodiment, the user can easily release the locking of the mobile terminal.

As aforementioned, the mobile terminal having the short cut code for moving the web page is not limited to the constitution and method of the embodiments. It should be understood that the person in the art may easily modify and alter the present disclosure by selectively combining the entire or part of the each embodiment.

What is claimed is:

1. A mobile terminal comprising:
a touchscreen; and
a controller configured to:
cause the touchscreen to display a directional icon at a first location in response to a touch input received at a second location of the touchscreen in a locked state, wherein the directional icon is associated with a transition from the locked state to an unlocked state, wherein the directional icon indicates a direction for a drag input and the displayed directional icon does not move to another displayed location after receiving the touch input, wherein the second location of the touch input is an arbitrary position on the touchscreen, and wherein the first location at which the directional icon is displayed is based on location of the touchscreen at which the touch input is received; and
cause the transition from the locked state to the unlocked state in response to receiving of the drag input beginning from the second location of the touch input, wherein prior to the touch input, there is no predetermined location for the directional icon.

2. The mobile terminal of claim 1, wherein the unlocked state is a state where a screen comprising a plurality of user-selectable icons is displayed on the touchscreen, wherein each icon of the plurality of user-selectable icons is associated with an application executable at the mobile terminal.

3. The mobile terminal of claim 1, wherein the locked state is a state where user input to the touchscreen is limited to only unlocking the mobile terminal.

4. The mobile terminal of claim 1, wherein the second location of the touch input is not-predetermined by the mobile terminal.

5. The mobile terminal of claim 1, wherein the drag input is in a predetermined direction.

6. The mobile terminal of claim 1, wherein the touch input includes a proximity touch input.

7. The mobile terminal of claim 1, wherein the touch input and the drag input each include a proximity touch input.

8. The mobile terminal of claim 1, wherein the direction of the drag input is arbitrary.

9. The mobile terminal of claim 1, wherein the direction of the drag input is predetermined.

10. A method comprising:
displaying, on the touchscreen, a directional icon at a first location in response to a touch input received at a second location of the touchscreen in a locked state, wherein the directional icon is associated with the transition from the locked state to an unlocked state, wherein the directional icon indicates a direction for a drag input and the displayed directional icon does not move to another displayed location after receiving the touch input, wherein the second location of the touch input is an arbitrary position on the touchscreen, and wherein the first location at which the directional icon is displayed is based on location of the touchscreen at which the touch input is received; and
transitioning from the locked state to the unlocked state in response to receiving of the drag input beginning from the second location of the touch input, wherein prior to the touch input, there is no predetermined location for the directional icon.

11. The method of claim 10, wherein the unlocked state is a state where a screen comprising a plurality of user-selectable icons is displayed on the touchscreen, wherein each icon of the plurality of user-selectable icons is associated with an application executable at the mobile terminal.

12. The method of claim 10, wherein the locked state is a state where user input to the touchscreen is limited to only unlocking the mobile terminal.

13. The method of claim 10, wherein the second location of the touch input is not-predetermined by the mobile terminal.

14. The method of claim 10, wherein the drag input is in a predetermined direction.

15. The method of claim 10, wherein the touch input includes a proximity touch input.

16. The method of claim 10, wherein the touch input and the drag input each include a proximity touch input.

17. The method of claim 10, wherein the direction of the drag input is arbitrary.

18. The method of claim 10, wherein the direction of the drag input is predetermined.

19. A mobile terminal comprising:
a touchscreen; and
a controller configured to:
determine position on a touchscreen of a touch input received at the touchscreen while in a locked state, wherein the position on the touchscreen of the touch input is an arbitrary position on the touchscreen;

cause the touchscreen to display an icon at a location that is near the determined position on the touchscreen of the touch input, wherein the location at which the icon is displayed is based on the determined position on the touchscreen at which the touch input is received, wherein the icon is associated with a transition from the locked state to an unlocked state, wherein the icon indicates a direction for a drag input and the displayed icon does not move from the displayed location; and cause the transition from the locked state to the unlocked state in response to receiving of the drag input beginning from the position on the touchscreen of the touch input, wherein prior to the touch input, there is no predetermined location for the icon.

\* \* \* \* \*